(12) United States Patent
Bechtold (10) Patent No.: US 7,600,911 B2
(45) Date of Patent: Oct. 13, 2009

(54) WATER-MIXING DEVICE, SAND TRAP AND METHOD OF USING SAME

(76) Inventor: Gerald L. Bechtold, 405 40$^{th}$ Ct., SW., Vero Beach, FL (US) 32968

( * ) Notice: Subject to any disclaimer, the term of this patent is extended or adjusted under 35 U.S.C. 154(b) by 762 days.

(21) Appl. No.: 11/331,272

(22) Filed: Jan. 13, 2006

(65) Prior Publication Data
US 2007/0165483 A1 Jul. 19, 2007

(51) Int. Cl.
*B01F 5/06* (2006.01)
(52) U.S. Cl. .................... 366/157.2; 366/337
(58) Field of Classification Search .......... 366/336, 366/337, 175.2; 210/207, 512.1, 512.3, 523
See application file for complete search history.

(56) References Cited

U.S. PATENT DOCUMENTS

| | | | |
|---|---|---|---|
| 3,045,828 A * | 7/1962 | Hume | 210/112 |
| 3,794,300 A | 2/1974 | Harder | |
| 3,953,002 A | 4/1976 | England, Jr. et al. | |
| 4,019,719 A | 4/1977 | Schuster et al. | |
| 4,408,893 A | 10/1983 | Rice, III | |
| 4,511,258 A | 4/1985 | Federighi et al. | |
| 4,643,584 A | 2/1987 | Allocca | |
| D299,950 S | 2/1989 | Canaan et al. | |
| 4,848,918 A * | 7/1989 | Kingsley et al. | 366/262 |
| 4,936,689 A | 6/1990 | Federighi et al. | |
| D326,503 S | 5/1992 | Ipsen | |
| 5,193,582 A | 3/1993 | Antoniello et al. | |
| 5,312,185 A | 5/1994 | Kojima et al. | |
| 5,484,203 A | 1/1996 | King et al. | |
| 5,492,408 A | 2/1996 | Alfare | |
| 5,654,008 A | 8/1997 | Herbert et al. | |
| 5,914,034 A * | 6/1999 | Ding et al. | 210/221.2 |
| 5,916,491 A | 6/1999 | Hills | |
| 6,036,178 A * | 3/2000 | Nilsson | 261/76 |
| 6,358,415 B1 * | 3/2002 | Leung | 210/205 |
| RE40,407 E * | 7/2008 | Natarius | 366/336 |
| 2007/0165483 A1 * | 7/2007 | Bechtold | 366/175.2 |

FOREIGN PATENT DOCUMENTS

| | | |
|---|---|---|
| DE | 4239906 | 6/1994 |
| GB | 2269624 | 2/1994 |

\* cited by examiner

*Primary Examiner*—Tony G Soohoo
(74) *Attorney, Agent, or Firm*—Novak Druce + Quigg LLP (57) ABSTRACT

A static mixer tank includes upper/first and lower/second mixing chambers, with the two mixing chambers being separated by a swirl chamber. The upper mixing chamber is arranged at an upper end of the mixing tube where materials would initial begin passage there through, and the lower mixing chamber is arranged at a lower end of the mixing tube and receives materials that may have to some degree been mixed by their passage through the upper mixing chamber. A series of baffles in the mixing chamber are arranged in sinusoidal or saw-tooth pairs that can be oppositely arranged, so that the mixer turns a drop of water into hundreds of microbubbles of rotating fluid, which allows the chemicals to exit the mixer and react with fluid in a storage tank as much five times faster than previously known. A variation includes a sand trap using the swirl chamber, cap, diverter chamber, and diffusing plate to separate sediment from a liquid without using a filter of moving parts.

21 Claims, 9 Drawing Sheets

WATER-MIXING DEVICE, SAND TRAP AND METHOD OF USING SAME

BACKGROUND OF THE INVENTION

1. Field of the Invention

The present invention relates to fluid mixing devices and fluid—solid separating devices. More particularly, the present invention relates to fluid mixing devices and fluid—solid separating devices which include a static material mixing apparatus and a cap. The present invention also relates to methods of using same.

2. Description of the Related Art

Static mixers are known in the art as devices that provide a way to mix materials without a motor (or rotor) and the energy required to power the motor (typically by spinning) and/or provide a swirling and/or agitating action to cause the materials to mix without requiring an energy source for the mixing action to occur.

One such type of static mixer includes a number of vanes arranged sequentially within a conduit. Whereas it is normally desirable for a fluid to have a laminar (smooth) flow, the vanes are arranged to create a turbulent flow by having the material strike the vanes on its path through a conduit (e.g., a pipe or barrel) by dividing the flow into a series of substreams, and then causing the sub-streams to recombine with a swirling action when exiting a particular vane, only to strike a successive vane and subdivide again, followed by recombination. The action of the material dividing and recombining as it passes through the conduit results in a completely homogeneous mixture being discharged from the conduit.

In the aforementioned mixer, the vanes are often constructed of complicated geometric configurations that are not only expensive to manufacture, but have been known at times to cause large variations in the pressure of the materials as they are being mixed by their passage through the conduit. The large drops of pressure at some portions of the configuration of the vanes are particularly undesirable, as the difference in the pressure at different points may cause the acceleration of the fluid in the pipe to reach undesirable levels.

U.S. Pat. No. 4,511,258 to Federighi et al. (herein after "Federighi '258") incorporated herein by reference discloses a mixing element that is simpler to manufacture than the vanes and in many ways, more effective because there are no large drops in pressure. Federighi '258 discloses a symmetrically formed mixing element to eliminate precision alignment with the conduit that was often necessary when using vanes. The mixing element includes two substantially identical segments having a sinuous cross-section between opposite ends.

In U.S. Pat. No. 4,936,689 to Federighi (hereinafter "Federighi '689") incorporated herein by reference, the inventor admits that certain prior art static mixers, which included those described in a previous patent (Federighi '258), had a shortcoming that becomes evident when mixing liquids that contain solids; such mixers are prone to clogging. In order to keep the mixer from staying unclogged, repeated maintenance at constant intervals is required, but there also needs to be a monitoring system in place to make sure there is no clogging. Not only is the use of the prior art system inefficient and costly, but the unclogging can be unpleasant when the mixer is used to mix sanitation items, such as sewage.

In addition, Federighi '689 discloses at column 3, lines 34-40 that a primary benefit of the invention is that solids suspended within the fluids can pass through an internal chamber 16 of the conduit 12 via a gap 21 between the radially spaced segments 14*a*, 14*b*.

However, there are still clogging problems and varying drops in pressure within the conduit that are associated with prior art static mixers. Thus, there is a need in the art for an improved static mixer.

There is also a need for improved gas-liquid contacting and liquid-liquid contacting to enhance water treatment, e.g., water chlorination or water treatment with ozone, because the simple use of an in-line mixer is insufficient for efficient contacting in a small space.

There is also a need for improved compact sand filters.

SUMMARY OF THE INVENTION

The invention provides a static mixer including a tank and a mixing tube inside the tank. The mixing tube is made of an upper/first and lower/second mixing chambers, with the two mixing chambers being separated by a swirl chamber. Each mixing chamber provided with baffles to be a static mixer. The upper mixing chamber is arranged at an upper end of the mixing tube where materials would initially begin passage there through, and the lower mixing chamber is arranged at a lower end of the mixing tube and receives materials that may have to some degree been mixed by their passage through the upper mixing chamber. The downwardly directed mixed stream then reverses direction by passage into an inverted cap, which includes a diverting plate, at a lower end of the tube which discharges the fluid stream such that the discharged fluid stream continues to swirl and mix in the tank with the other fluid in the tank.

In particular, the mixing tube is typically a conduit comprising an upper mixing chamber, a swirl chamber, a lower mixing chamber and diverter valve (also termed a "diverter chamber"). The upper mixing chamber has a first inlet and a first outlet and an axial centerline in a longitudinal direction of main stream flow. The swirl chamber has a second inlet and a second outlet, the second inlet being in fluid communication with the first outlet of the upper mixing chamber. The lower mixing chamber has a third inlet and a downwardly directed third outlet and an axial centerline in the longitudinal direction of main stream flow, the third inlet of the lower mixing chamber being in fluid communication with the second outlet of the swirl chamber. A plurality of baffles are arranged within the upper mixing chamber and the lower mixing chamber, wherein the plurality of baffles are shaped and arranged for subdividing a flow of an additive material against a plurality of portions of an internal perimeter of the upper mixing chamber and the lower mixing chamber, and for redirecting the subdivided flow of the additive material to the axial centerline of the upper and lower mixing chambers to form a single direction mixing vortex axial to the centerline of the upper mixing chamber and the lower mixing chamber. The diverter chamber has sidewalls provided at a lower end of the conduit below the lower mixing chamber, the diverter chamber having a fourth inlet and a fourth outlet, the fourth inlet being in fluid communication with the third outlet of the lower mixing chamber and arranged in the longitudinal direction of the main stream flow of the lower mixing chamber, and the fourth outlet comprising a plurality of slits in the diverter chamber sidewalls, the slits being radially arranged relative to the axial direction of the lower mixing chamber. A cap is provided having a bottom wall and one or more cap sidewalls, the cap being connected to a lower portion of the diverter chamber, and the cap sidewalls spaced from the diverter chamber and having a height that extends upwardly at least approximately to a height of the plurality of slits to overlap the slits and define an annular region between inner surfaces of the cap sidewalls of the cap and outer walls of the diverter chamber. A diffuser plate is spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap.

The invention permits the mixing of liquid additives or gaseous additives to a liquid stream with increased efficiency than known heretofore in a static mixer. The internal design of the mixer turns a drop of water into hundreds of micro bubbles, which allows the chemicals to mix and react as much five times faster than a prior art static mixer. The micro bubbles increase the available surface area that can react with the other chemicals.

For purposes of illustration and not intended to limit the scope of the invention in any way, some of the multitude of materials that can be mixed using the present invention includes air, chlorine, ozone, fertilizer, phosphates, potassium, peroxide. The micro bubbles can be used to boost the effectiveness of air, chlorine, ozone, or anything else that is required to be mixed thoroughly.

The swirl chamber is formed by spacing the upper mixing from the lower mixing chamber by the desired length and circumference of the swirl chamber. The swirl chamber may optionally include a rotational passageway to assist in causing the liquid to continue to rotate (swirl) as it passes through the swirl chamber.

Moreover, the swirl chamber provides an advantage in that the materials to be mixed continue to spin while traveling downwardly toward the second/lower mixing chamber. The lower mixing chamber is optionally formed such that there are baffles arranged to cause fluid rotation in a direction that is opposite to the upper mixing chamber.

In one particular embodiment of the invention, the static mixer has first and second longitudinally elongated baffles. Each baffle has a plurality of attached segments forming a series of peaks and valleys resulting in a saw-tooth or sine curve longitudinal cross-section. Each segment extends from one peak of the respective baffle to an adjacent valley of the respective baffle. The peaks and valleys of the longitudinal cross-section of the first baffle alternate with the peaks and valleys of the longitudinal cross-section of the second baffle.

A method for mixing a first liquid material and an additive material in the static comprises the steps of:

passing a first liquid material and an additive material through an upper mixing chamber, a swirl chamber, a lower mixing chamber and a diverter chamber of a conduit in a tank;

the upper mixing chamber having a first inlet and a first outlet and an axial centerline in a longitudinal direction of main stream flow;

the swirl chamber having a second inlet and a second outlet, the second inlet being in fluid communication with the first outlet of the upper mixing chamber;

the lower mixing chamber having a third inlet and a downwardly directed third outlet and an axial centerline in the longitudinal direction of main stream flow, the third inlet of the lower mixing chamber being in fluid communication with the second outlet of the swirl chamber;

a plurality of baffles arranged within the upper mixing chamber and the lower mixing chamber, wherein the plurality of baffles are shaped and arranged for subdividing a flow of the first material and the additive material against a plurality of portions of an internal perimeter of the upper mixing chamber and the lower mixing chamber, and for redirecting the subdivided flow of the first material and the additive material to the axial centerline of the upper and lower mixing chambers to form a single direction mixing vortex axial to the centerline of the upper mixing chamber and the lower mixing chamber to form a mixed stream;

discharging the mixed stream from the lower mixing chamber downwardly into the diverter chamber;

discharging the mixed stream from the diverter chamber laterally through slits, radially arranged in sidewalls of the diverter chamber relative to the axial direction of the lower mixing chamber, into an annular region defined between outer walls of the diverter chamber and inner sidewalls of a cap and passing the mixed stream upwardly through the annular region, the cap having a bottom wall and the cap sidewalls, the cap being connected to a lower portion of the diverter chamber, and the cap sidewalls spaced from the diverter chamber and having a height that extends upwardly at least approximately to a height of the plurality of slits to overlap the slits and define an annular region between inner surfaces of the cap sidewalls of the cap and outer walls of the diverter chamber;

the mixed stream discharging from the annular region and being diverted by a diffuser plate spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap;

discharging the mixed stream from the discharge area such that the mixed stream has centrifugal motion when the mixed stream discharges from the discharge area and contacts the material in the tank; and receiving the mixed material from an exit port of the tank arranged to receive the mixed stream as the mixed stream rotates upward in the tank.

In a second embodiment of the present invention, a sand trap having an internal swirl chamber permits water to pass the internal swirl chamber and into a diverting plate, to permit heavier particles to settle to the bottom of the tank for blow down.

In particular, the present invention provides a sandtrap device comprising:

a tank; a fluid outlet port arranged at an upper portion of the tank; a drain port arranged at a lower portion of the tank; a conduit comprising a mixing chamber and a diverter chamber inserted into the tank; a cap; and a diffuser plate. The mixing chamber has a first inlet and a first outlet and an axial centerline in a longitudinal direction of main stream flow. A plurality of baffles are arranged within the mixing chamber, wherein the plurality of baffles are shaped and arranged for subdividing a flow of an additive material against a plurality of portions of an internal perimeter of the upper mixing chamber and the lower mixing chamber, and for redirecting the subdivided flow of the additive material to the axial centerline of the upper and lower mixing chambers to form a single direction mixing vortex axial to the centerline of the upper mixing chamber and the lower mixing chamber. The diverter chamber has sidewalls provided at a lower end of the conduit below the mixing chamber, the diverter chamber having a second inlet and a second outlet, the second inlet being in fluid communication with the first outlet of the mixing chamber and arranged in the longitudinal direction of the main stream flow of the mixing chamber, and the second outlet comprising a plurality of slits in the diverter chamber sidewalls, the slits being radially arranged relative to the axial direction of the mixing chamber. The cap has a bottom wall and one or more cap sidewalls, the cap being connected to a lower portion of the diverter chamber, and the cap sidewalls spaced from the diverter chamber and having a height that extends upwardly at least approximately to a height of the plurality of slits to overlap the slits and define an annular region between inner surfaces of the cap sidewalls of the cap and outer walls of the diverter chamber. The diffuser plate is spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap. A length of the conduit within the tank chamber is approximately one-half to two thirds of a height of the tank.

In its method respects, the present invention provides a method for separating solids from liquid in the sandtrap device of the present invention, comprises: passing a feed stream comprising liquid and solids through a conduit comprising a mixing chamber and a diverter chamber inserted into a tank, the mixing chamber having a first inlet and a first outlet and an axial centerline in a longitudinal direction of main stream flow; passing the feed stream through a plurality of baffles arranged within the mixing chamber, wherein the plurality of baffles are shaped and arranged for subdividing a flow of the feed stream against a plurality of portions of an internal perimeter of the mixing chamber, and for redirecting the subdivided flow of the feed stream to the axial centerline of the mixing chamber to form a single direction mixing vortex axial to the centerline of the mixing chamber; downwardly discharging the feed stream into a diverter chamber having sidewalls provided at a lower end of the conduit below the mixing chamber, the diverter chamber being in fluid communication with the mixing chamber and arranged in the longitudinal direction of the main stream flow of the mixing chamber, discharging the feed fluid from the diverter chamber laterally through slits, radially arranged in sidewalls of the diverter chamber relative to the axial direction of the lower mixing chamber, into an annular region defined between outer walls of the diverter chamber and inner sidewalls of a cap and passing the mixed stream upwardly through the annular region, the cap having a bottom wall and the cap sidewalls, the cap being connected to a lower portion of the diverter chamber, and the cap sidewalls spaced from the diverter chamber and having a height that extends upwardly at least approximately to a height of the slits to overlap the slits and define an annular region between inner surfaces of the cap sidewalls of the cap and outer walls of the diverter chamber; the feed stream discharging from the annular region and being diverted by a diffuser plate spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap; discharging the feed stream from the discharge area such that the feed stream has centrifugal motion to separate at least a portion of the solids from the liquid in the feed stream when the feed stream discharges from the discharge area and contacts the material in the tank to produce a liquid product stream; receiving the liquid product stream from a fluid outlet port of the tank arranged at an upper portion of the tank to receive the liquid product stream as the liquid product stream rotates upward in the tank; and receiving the separated solids from a drain port arranged at a lower portion of the tank; wherein a length of the conduit within the tank chamber is approximately one-half to two thirds of a height of the tank.

BRIEF DESCRIPTION OF THE DRAWINGS

These and other characteristics of the invention will be clear from the following description of a preferred form of the embodiments, given as non-restrictive example, with reference to the attached drawings wherein.

DETAILED DESCRIPTION OF THE INVENTION

It is understood by a person of ordinary skill in the art that the drawings are presented for purposes of illustration and not for limitation. The embodiments shown and described herein do not encompass all possible variations of the arrangement of structure, and an artisan appreciates that many modifications can be made within the spirit of the invention and the scope of the appended claims.

Figure 1:
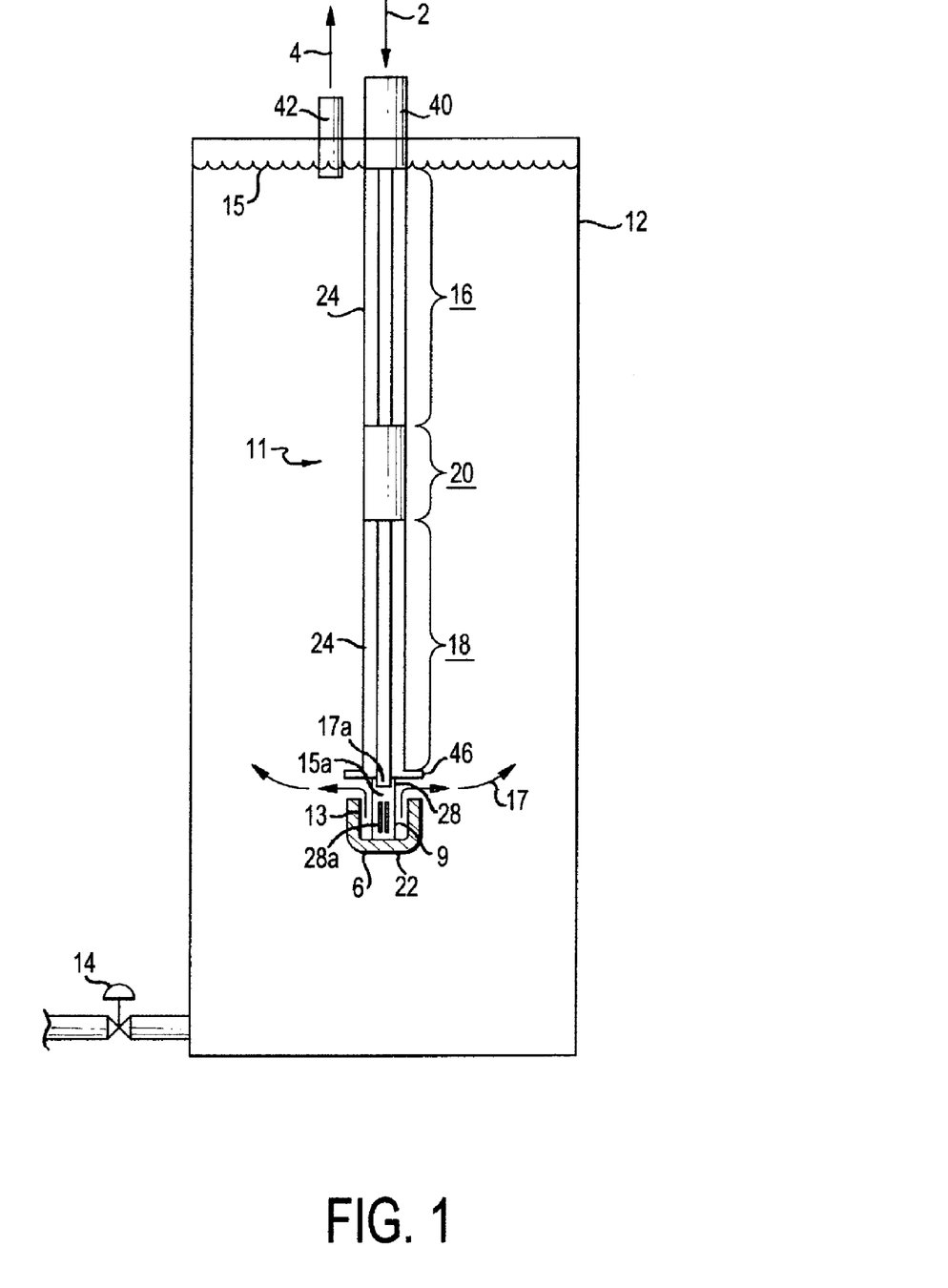
FIG. 1 is a schematic of a tank including a mixing device according to the present invention.

FIG. 1 is an illustration of a first embodiment 10 of the present invention having a tank 12 and a static mixing device 11 according to the present invention located within the tank 12. The tank 12 has an outlet or drain valve 14 near a lowermost portion to facilitate drainage by gravity. The tank 12 may be filled with a first material 15, which may or may not be a fluid material. A feed stream 2 including water and an additive feeds an upper end of the static mixing device 11. In the mixing device 11 the water and additive are mixed to form a mixed stream 17. Then in the tank 11 the mixed stream 17 mixes with the contents of the tank 11 and then exits the tank through discharge conduit 42 as a discharge stream 4.

Still referring to FIG. 1, the mixing device 11 has an upper mixing chamber 16 and a lower mixing chamber 18 separated by a swirl chamber 20, with an upside down cap 22 at the end of the lower mixing chamber 18. The upper mixing chamber 16, lower mixing chamber 18 and the swirl chamber 20 may have a conduit (or pipe or tube) 24 as an external housing.

There can be a common conduit 24 or a series of connected conduits arranged to house the upper and lower mixing chambers 16, 18 and the swirl chamber 20. Inside the conduit 24 is a passageway. The diameter of the conduit passageway can be either the same throughout or varied in size. At the end of the lower mixing chamber 18 there is a diffuser plate 46, followed by a diverter valve 28 (also termed a diverter chamber), which provides an annular space between the lower mixing chamber 18 and the cap 22.

As shown in FIG. 1, the diverter valve 28 (also termed a "diverter chamber") has sidewalls 13 provided at a lower end of the conduit below the lower mixing chamber 18, the diverter valve 28 has an inlet 15a and an outlet 28a. The inlet 15a being in fluid communication with an outlet 17a of the lower mixing chamber 18 and arranged in the longitudinal direction of the main stream flow of the lower mixing chamber 18. The diverter valve outlet 28a comprising a plurality of slits 28a in the diverter valve sidewalls 9. The slits 28a being radially arranged relative to the axial direction of the lower mixing chamber 18. The cap 22 has a bottom wall 6 and one or more cap sidewalls 13, the cap 22 being connected to a lower portion of the diverter valve 28, and the cap sidewalls 13 spaced from the diverter valve 28. The cap 22 has a height L1 that extends upwardly at least approximately to a height L2 of the plurality of slits to overlap the slits and define an annular region between inner surfaces of the cap sidewalls of the cap and outer walls of the diverter chamber. Typical heights L1 of the cap 22 range from about 1 to 3 inches. The diffuser plate 46 is separated from an upper edge of the cap 22 a distance "L3". Typically the diffuser plate 28 is located about 0.25 to about 2 inches, for example from about 0.5 to 1.5 inches, above the upper edge of the cap 22. Typically the diffuser plate 46 has an annular shape. However, other shapes are also suitable.

Figure 2:
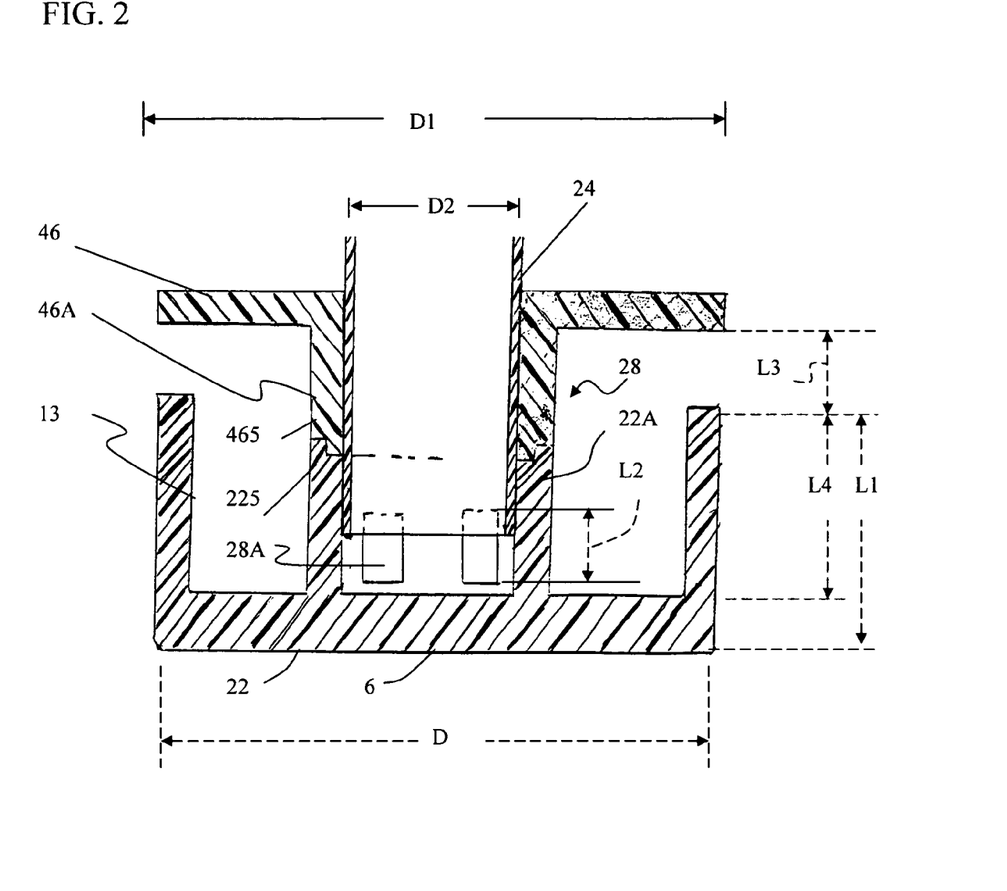
FIG. 2 is a cross section of an assembly of the diverter plate, diverter valve and cap of FIG. 1.
Figure 3:
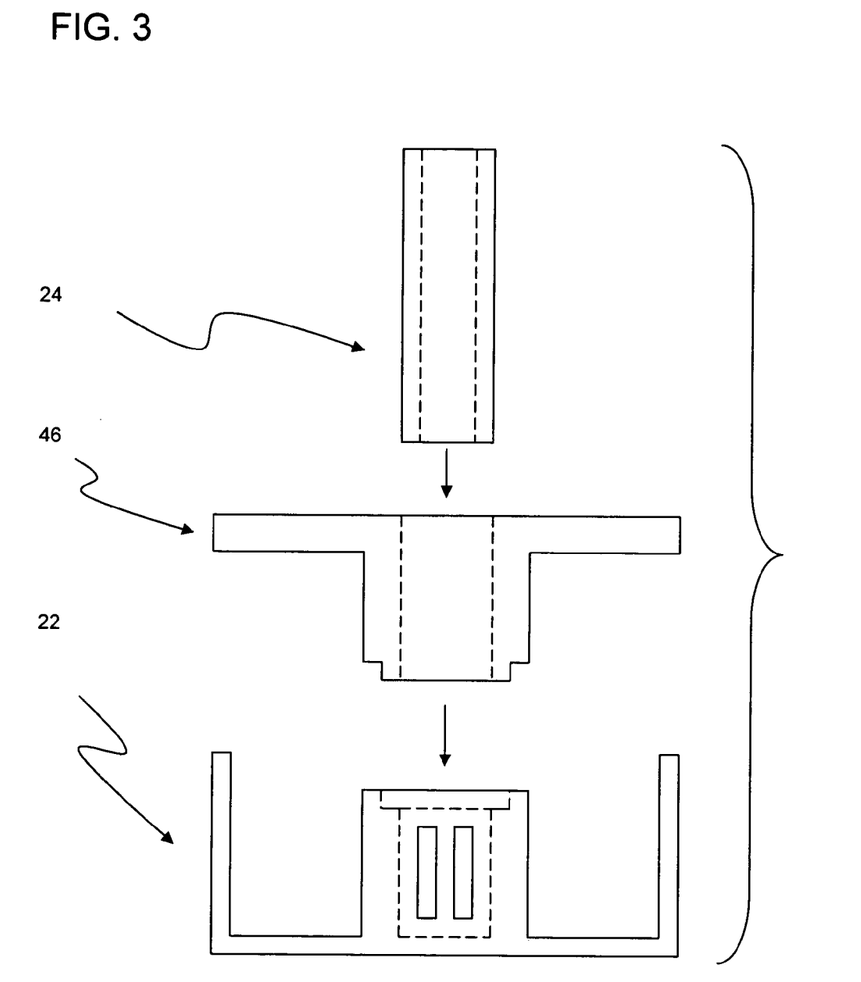
FIG. 3 is an exploded view of the components shown in FIG. 2.
Figure 7:
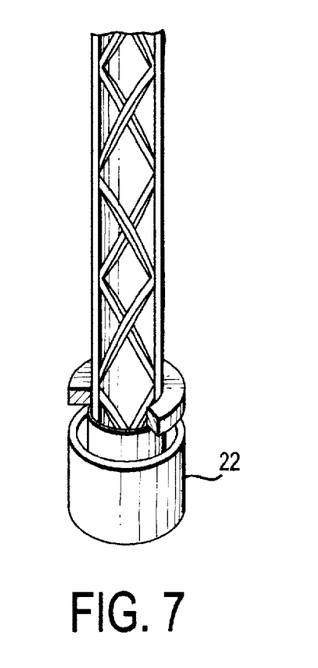
FIG. 7 is a close up photograph of the end cap of the lower mixing chamber of FIG. 4 with a portion of the tube and the deflecting plate removed to better show the baffles.

FIG. 2 and FIG. 3 illustrate the construction of the lower portion of the end cap of the mixing device according to the present invention. FIG. 2, which is a cross section of a cap such as shown in FIG. 7, is comprised of three parts that are preferably connected using an adhesive. However, an artisan appreciates there are other techniques to assembly the structure of the lower assembly.

For example, as shown in FIG. 2, the diverter plate 26, which has an outer diameter "D1" that is approximately the same size as the outer diameter "D" of the cap 22, also has a stepped portion 465 complementary to a stepped portion 225 of cap 22. The extension 46A of the diffuser plate 46 is preferably bonded to the cap 22 at the meeting of the steps 225, 465, but an artisan appreciates there are other way to connect these pieces to each other. In turn, the lower end of conduit 24 is inserted into the diffuser plate 46 to be seated in a central portion of the cap 22, with the diverter valve shaft having an outer diameter D2. The central portion of the cap 22 can be sized to receive the conduit 24 as a type of friction fit, but an adhesive is preferably used to attach the conduit to the cap diffuser pale extension 46A and the extension 22A of the cap 22. Adhesive may also be applied between the steps 225, 464.

The diffuser plate 26 being spaced a distance "L3" from an upper edge of the cap 22 to define a discharge area, the diffuser plate 46 extending radially from the conduit of the mixing device 11 to define a surface which overlaps the entire annular opening defined by the upper edge of the cap 22. The diffuser plate 46 is generally parallel to the upper edge of the cap 22.

An annular area (AA) is defined between the upper edge of the cap 22 and the walls 13 of the diverter valve 28 and a discharge area (DA) is defined by phantom cylindrical sidewall in the space from the upper portion of the inner sidewalls 13 of the cap 22 to the diffuser plate 46. Typically a ratio of an annular area (AA) to the discharge area (DA) ranges from about 1:0.7-3, or from about 1:0.8-2, or from about 1:1-1.5.

For example, if hypothetically the annular area has an outer diameter of about 2.5 inches (radius of about 1.25 inches) and an inner diameter is about 1 inch (radius of about 0.5 inches), the annular area (AA) is calculated as follows:

$$AA = \pi[r_o^2 - r_i^2] = [(1.25 \text{ inches})^2 - (0.5 \text{ inches})^2] = 4.1 \text{ sq. in.}$$

and if the phantom cylinder discharge area (DA) has the diameter of about 2.5 inches and a height of about 0.6 inches, the discharge area (DA) is calculated as follows:

$$DA = \pi \times d \times h = 3.14 \times 2.5 \text{ inches} \times 0.6 \text{ inches} = 4.7 \text{ sq. in.}$$

Thus, the ratio of AA:DA is 1:1.14

Figure 4:
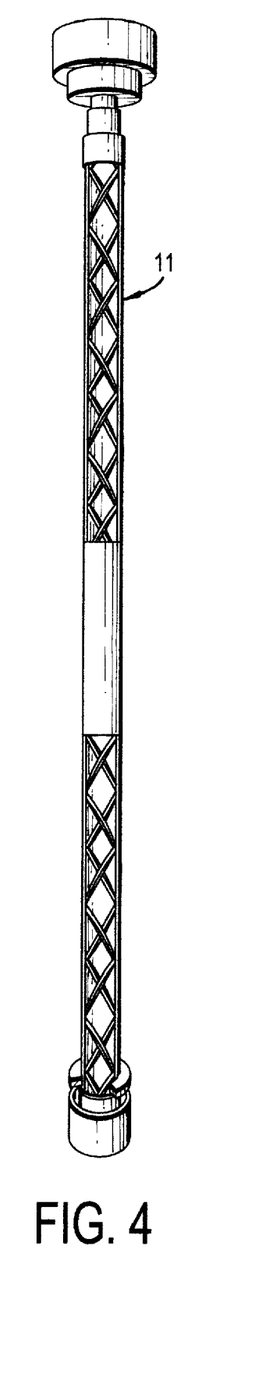
FIG. 4 is a photograph of a static mixing device suitable for being employed in the embodiment of FIG. 1 with portions of tube removed to show the internal baffles of the upper and lower mixing chambers.

FIG. 4 is a photograph of a static mixing device suitable for being employed in the embodiment of FIG. 1 with portions of tube removed to show the internal baffles of the upper and lower mixing chambers. FIG. 2 shows an elongated pair of baffles for each of the upper and lower mixing chambers.

Figure 5:
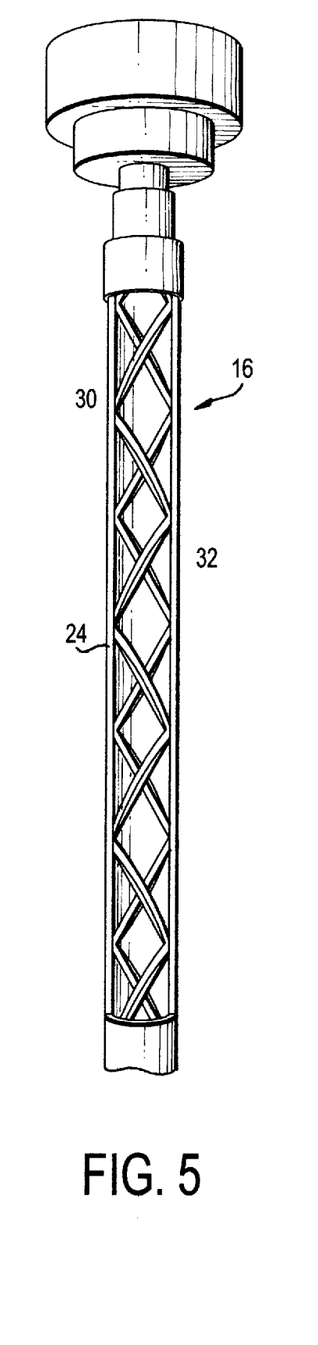
FIG. 5 is a photograph of the upper mixing chamber of the embodiment of FIG. 4 with a portion of the tube removed to better show the baffles.

FIG. 5 is a photograph of the upper mixing chamber 16 of the embodiment of FIG. 4 with a portion of the tube removed to better show the baffles 26.

Figure 6:
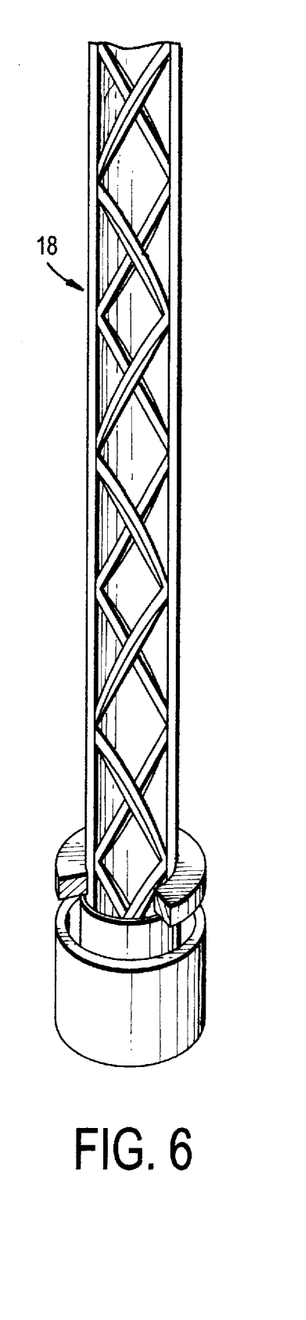
FIG. 6 is a photograph of the lower mixing chamber of the embodiment of FIG. 4 with a portion of the tube and the deflecting plate removed to better show the baffles.

FIG. 6 is a photograph of the lower mixing section of the embodiment of FIG. 4 with a portion of the tube and the deflecting plate removed to better show the baffles 26.

FIG. 7 is a close up photograph of the end cap 22 of the lower mixing chamber of FIG. 4 with a portion of the tube and the deflecting plate removed to better show the baffles.

Figure 8:
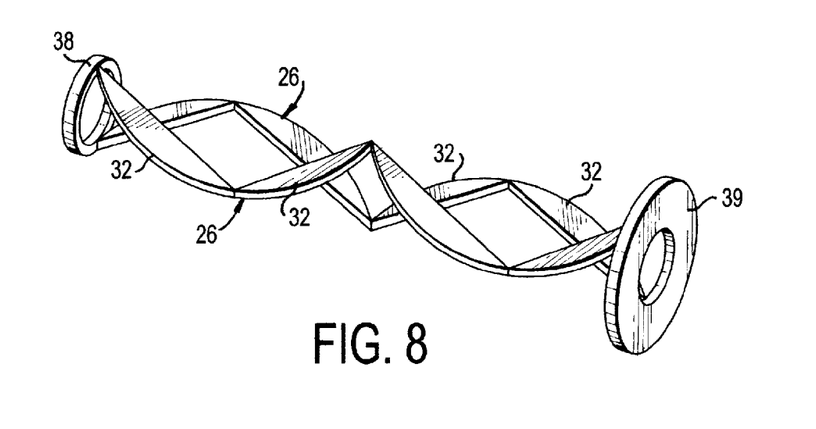
FIG. 8 is a perspective view of a pair of baffles having a small washer at one end and a larger washer at the other end.

FIG. 8 is a perspective view of the set of baffles 26 having a small washer 38 at one end and a larger washer 39 at the other end. The larger washer 39 of an upper set of baffles 26 is provided to contact the upper edge of the swirl chamber 20 to force flow from the upper chamber 16 through the center hole of the washer 39 into the swirl chamber 20. The larger washer 39 of a lower set of baffles 26 is provided to contact the lower edge of the swirl chamber 20 to force flow from the swirl chamber 20 through the center hole of the washer 39 into the lower chamber 16. The large washer is also useful to center the baffles 26 in the event a series of baffles are employed in either mixing chamber 16, 18.

FIG. 8 shows the elongated baffles 26 are each made up of a series of segments 32 forming a series of peaks and valleys. The peaks and valleys generally follow a sinusoidal or sawtooth pattern. This pattern of segments causes the fluid to disburse/splatter and lends itself to causing droplets to break up into a plurality of micro bubbles.

Figure 9:
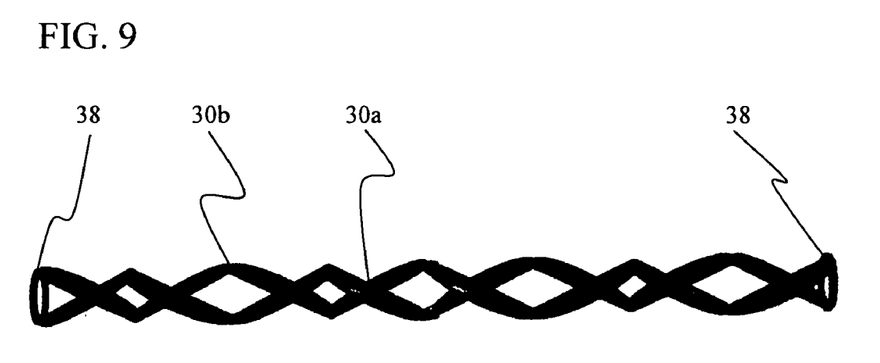
FIG. 9 is a side view of a pair of baffles having a small washer at both ends.

FIG. 9 illustrates the pair of baffles 30a, 30b removed from the conduit. FIG. 9 is a perspective view of a pair of baffles 30a, 30b which differ from baffles 26 of FIG. 6 in that the baffles 30a, 30b of FIG. 9 have a small washer 38 at both ends. FIG. 8 is a side view of the pair of baffles 30a, 30b of FIG. 9. FIG. 9 shows the peaks and valleys of the longitudinal cross-section of first baffle 30a alternate with the peaks and valleys of the longitudinal cross-section of the second baffle 30b referring to FIG. 9, each of the baffles 30a, 30b has an inside edge 31a and an outside edge 31b. The segments of the first baffle 30a define a first crossing location 34 on a portion of the inside edge between the peak and the valley of the first battle segment. Each segment of the second baffle 30b defines a second crossing location 36 on a portion of its inside edge between the peak and valley of the second baffle segment. The first crossing location 34 crosses, and typically is attached to, a respective second crossing location 36.

Still referring to FIG. 9, each baffle width narrows in a direction transverse to each peak and value by anywhere from approximately 40% to 80%. Circular ends 38 are arranged at respective longitudinal edges of baffles 30a, 30b. The circular ends are positioned substantially perpendicular to the longitudinal direction of the segments that comprise the baffle pair 30a, 30b, and define respective axial holes at each end.

Typically, the circular ends 38 provide a uniform support structure as a base for the baffle pair 30a, 30b. The diameter of each circular end 38 is usually less than an internal diameter of the conduit 24 in which it is arranged. The circular ends may also be constructed of different size diameters. For example, a first circular end can have a diameter that is large enough to extend to the internal diameter of the conduit 24. In such a case, the second circular end can be made to be somewhat smaller in diameter than the first circular end so as to facilitate seating of the second circular end in another component of the device. It is also possible that the diameter of the second circular end can be larger than the first circular end.

Optionally, the baffles in the lower mixing chamber 18 can be arranged so as to be opposite of those arranged in the upper mixing chamber 16. The arrangement of the baffles in the upper mixing chamber and lower mixing chamber can be designed to reverse the rotation of the fluid as it passes through the lower portion of the conduit after passage through the upper portion.

Referring to FIG. 1, the diffuser plate 46 extends radially from at least a lower portion of the conduit 24 housing the lower mixing chamber. The diffuser plate 46 has an annular area defined by its diameter, and is spaced from the upper portion of the cap 22 to define a discharge area. The ratio of the annular area to the discharge area ranges from 1: about 0.75 to 2, typically 1: about 1 to 1.5. This ratio assists to maintain a high flow rate out of the discharge area when desired to enhance the mixing in the tank outside of the tube.

A typical maximum flow rate through a mixing chamber of the embodiment of FIG. 1 is 24 gallons per minute for a 12 inch inside diameter tank with a mixing chamber conduit having about a 1 inch inside diameter.

Still referring to FIG. 1, the directional diverter valve 28 has an upper end in fluid communication with an axial hole of the circumferential end of the pair of baffles in the lower mixing chamber. The cap 22 has substantially concentric sidewalls having a diameter larger than at least a portion of the diverter valve 28, so as to define a channel there between. A series of openings 28a (e.g., slits) are provided in at least a sidewall of the diverter 28. The sidewalls of the cap typically extend at least as high as a top of the openings 28a.

Figure 10:
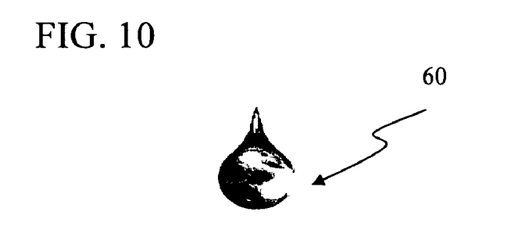
FIG. 10 illustrates a single drop of additive.
Figure 11:
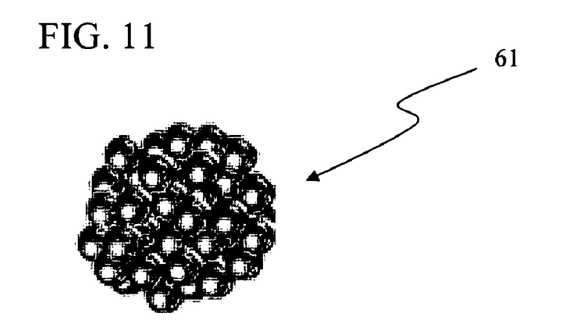
FIG. 11 illustrates a single drop of additive subdivided into a plurality of micro bubbles to enhance mixing saturation.

FIG. 10 shows an illustration of one drop 60 of an additive, e.g. chlorine containing additive. FIG. 11 shows this drop 60 transformed into a plurality of micro bubbles of the additive because of the design of the static mixer according to the present invention. As a result of the creation of micro bubbles, the present invention is faster and provides more efficient mixing of the additive to the liquid in the tank.

In operation, while referring to the embodiment shown in FIG. 1, where two materials are about to be mixed together, such as, for example a second material such as an additive such as chlorine and the first material 15 in liquid form (such as water in the tank 10), the chlorine can be poured into the inlet 40. The interior of the tank 12 typically contains the second material and liquid first material 15. Once the second material (in this case chlorine) is poured into the inlet 40, the second material flows downward through the mixing chambers.

While passing through the upper mixing chamber 16, the baffle pair 30a, 30b divides the flow into two downwardly flowing streams that subsequently recombine. In other words, the design of the baffles force the path of the streams to opposite outside walls of the conduit and then redirect the separated streams to the axial center to form a single direction mixing vortex axial to the centerline (longitudinal axis) of the mixing chambers.

As the liquid flows past the location where the two baffles cross, the mixing vortex is sheared and the main stream is divided again, but now flows in an opposite directional rotation. After exiting the upper chamber, the fluid enters the swirl chamber 20 prior to entering the lower chamber 18.

In both the upper and the lower mixing chambers, the mixing is being performed around the axial centerline and in the direction of the main stream flow, having considerably less back pressure realized with better mixing than conventional static mixers.

The baffles in the lower mixing chamber 18 terminate in the lower mixing chamber 18, and the fluid enters into the diverter valve 28. The fluid flows through the slits 28a in the sidewalls of the diverter valve 28 with a centrifugal force causing it to rotate about a centerline of the diverter valve. Then the liquid is redirected upwardly (due to the cap) while still retaining its spinning motion through the annular space between the cap 22 and the diffuser plate 46. The diffuser plate 46 redirects the upwardly spinning liquid to travel laterally with a spinning motion.

The diffuser plate 46 essentially turns the tank into a big mixing tank because the spinning motion of the liquid discharged from the diverter valve 28 causes the liquid 15 in the tank to rotate. The liquid mixed with the first material (in this case chlorine) then travels upwardly and discharges through a port 27 in an upper portion of the mixing tank typically alongside the top inlet.

Sand Trap

A second embodiment of the present invention is suitable for another use, namely to separate solids from liquids, typically to separate sand (or other solids) from water.

Figure 12:
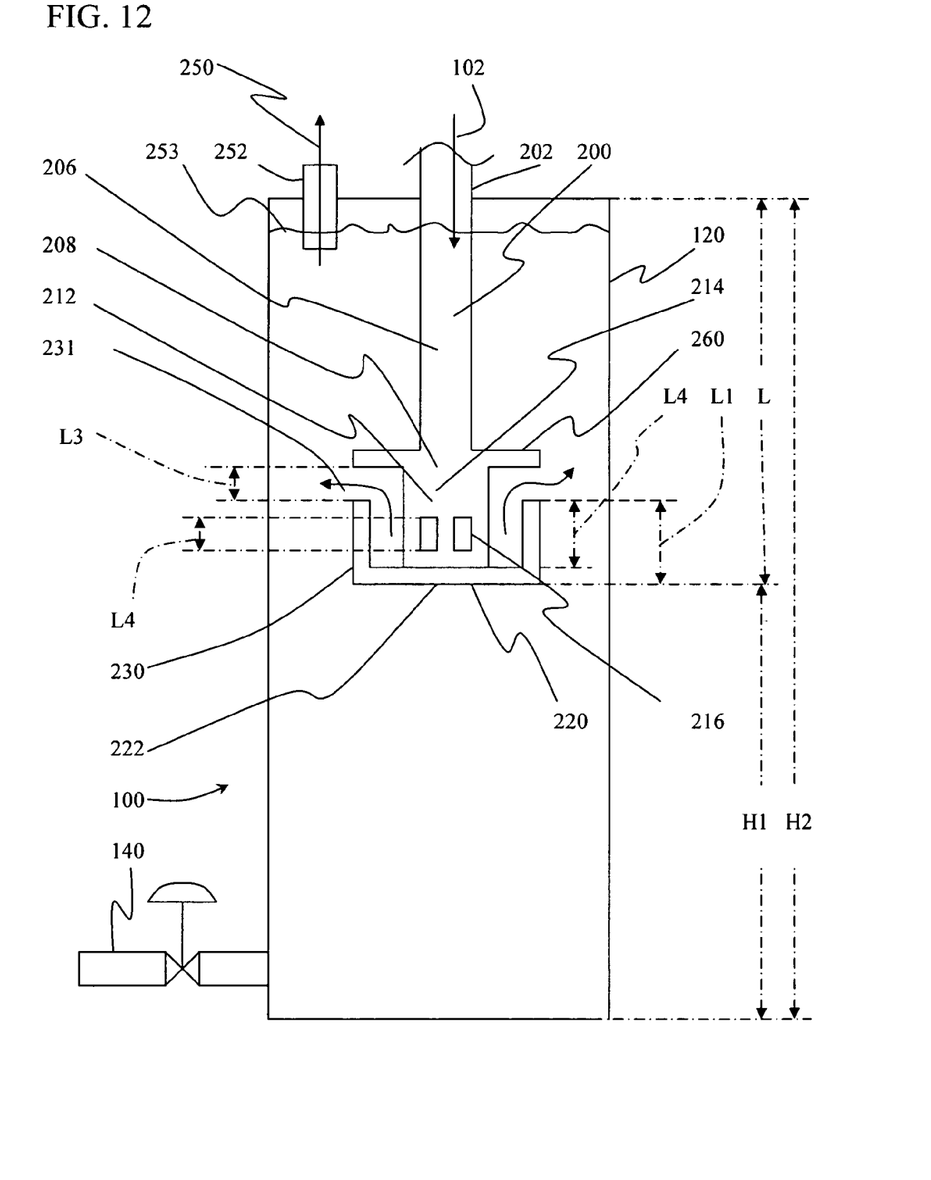
FIG. 12 is a schematic drawing of a sand trap according to another embodiment of the present invention, wherein the sand trap separates solid particles from liquids without using a filter.

FIG. 12 is a schematic drawing of a sand trap 100 according to the second embodiment of the present invention.

The sand trap 100 contains a tank 120, having an outlet or drain valve 140 near a lowermost portion to facilitate drainage by gravity. The sand trap 100 contains the at least one mixing chamber 200, the cap 22, the diffuser plate 26 and diverter valve 280 (also termed a "diverter chamber")

Still referring to FIG. 12, the in-line mixer extends a distance "L" to be shorter than the mixer shown in FIG. 1, so as to leave a significant distance "H1" above the bottom of the tank 120. This distance "H1" is approximately from about one-half to two-thirds of the height "H2" of the tank 120.

In operation, the sand trap 100 has water containing sand or other fine particles running through the swirl chamber 200 that exits via the diverting valve 280. The water exiting the diverting valve has centrifugal movement. As the cap 220 redirects the spinning water upward and the diffuser plate 260 directs the spinning water laterally, the heavier particles, such as sand, shale, etc. will settle in the bottom of the tank for a blow-down via the drain 140. Thus the sediment can be separated from the liquid without using any moving parts, and without requiring filter cartridges, electricity, or backwashing. Typical particle size of separated sand is that of "sugar sand." A typical particle that can be separated by the present invention for example has a particle size such as 5 to 400 microns or 20 to 200 microns. Additional chemicals such as alum can be added if desired to the water to enhance separation.

The sand trap 100 separates solid particles from liquids without using a filter. As shown in FIG. 12, a feed stream 102 feeds the mixing device 200 located in a tank 120 provided as the conduit 202 containing a mixing chamber 206 employing a pair of baffles 223 (FIG. 15, baffles 223 shown in white) as a static mixer. The typical maximum flow rate through the mixing chamber 206 is 24 gallons per minute for a tank having an inside diameter of about 10 inches and a conduit 202 having an inside diameter of about 1 inch.

The tank 120 shown in FIG. 10 is approximately 12 inches in diameter, but this size can be varied according to need.

The pair of baffles 223 is the same as or similar to the pair of baffles (see FIG. 6) in the lower chamber 18 of the first embodiment. The mixing chamber 200 terminates into the diverter chamber 280 (also termed a "diverter valve"). The feed stream 102 discharges from the mixing chamber 200 into the diverter chamber 280. The stream 102 then discharges through slits 216 provided in sidewalls of the diverter chamber 280 into an annular region defined between the outer walls of the diverter chamber 280 and the inner sidewalls 230 of an upside down cap 220. The feed stream then exits from the annular region and is deflected by the diffuser plate 260 as stream 231 which enters the surrounding liquid in the tank 198. Stream 231 has a centrifugal motion as it discharges from between the upper edge of the cap 220 and the diffuser plate 260 such that the solids travel radially and then downwardly while the liquids travel upwardly and discharge as product stream 250 through outlet conduit 252 which extends below the upper liquid surface 253.

The diverter chamber 280 has sidewalls provided at a lower end of the conduit 202 below the mixing chamber 200. The diverter chamber 280 has an inlet 214 and an outlet 216. The inlet 214 being in fluid communication with the outlet 208 of the mixing chamber 200 and arranged in the longitudinal direction of the main stream flow of the mixing chamber 200, and the outlet 216 comprising a plurality of slits 216 in the diverter chamber sidewalls. The slits 216 are radially arranged relative to the axial direction of the mixing chamber 200. Typically, there are six slits arranged in the diverter chamber sidewalls, but this number can be increased or decreased according to need. About 30-70% of the wall space should have slits 216 therein, with about 50% being a typical construction. These percentages are provided as guidance but an artisan appreciates that it is within the spirit of the invention and the scope of the appended claims to use percentages outside of those disclosed above. An artisan may consider the viscosity of the fluids and in the case of the sand trap, the size of the particles, when selecting the number of slits and the amount of wall space in which they are arranged.

The cap 220 has a bottom wall 222 and one or more cap sidewalls 230, the cap 220 being connected to a lower portion of the diverter valve 280, and the cap sidewalls 230 spaced from the diverter valve 280.

The cap 220, conduit 202 and diffuser plate are typically assembled as described in more detail above for the cap 22, conduit 24 and diffuser plate 46 of the water filtration device of FIGS. 2 and 3. Thus, a channel extends downwardly from the diffuser plate 260 and has a stepped portion (not shown) which interlocks with a complimentary stepped portion (not shown) of a channel extending upwardly from the lower inner wall of the cap 220. Then the lower end of the conduit 202 is slid through the channel extending downwardly from the diffuser plate 260 into the channel extending upwardly from the cap 220 and glued in place to not entirely block the slits 216.

An embodiment of the diverter valve 280 shown in FIG. 12 typically has an outer diameter of about 1 inch. The outer diameter of the diffuser plate 26 is at least as large as the outer diameter of the cap 220. A typical embodiment of the cap 220 shown in FIG. 12 has an outer diameter of about 2.6 inches, and the outer diameter of the diffuser plate 26 is also about 2.6 inches. The cap 220 has a height "L1" that extends upwardly at least about to a height "L2" of the plurality of slits 216 to overlap the slits 216 and define an annular region between inner surfaces of the cap sidewalls 230 and outer walls of the diverter chamber 280. Typical heights L1 of the cap 220 range from about 1 to 3 inches, for example about 2 inches.

The slits 216 are typically about 0.9 to 1.6 inches high (L2), and about 0.4 inches wide. A typical height (L4) of the inner sidewalls 230 of the cap 220 is about 1.8 inches high measured from the upper surface of the floor of the cap 220 to the upper edge of the cap 220, (with the floor of the cap being approximately 0.25 inches thick). Thus, "L4" identifies the height of the annular region, which is taller than the slits 216, and the highest portion of the slits 216 should be arranged below the upper portion of the sidewalls 230 so that the liquid exiting the slits travels upward to exit the annular region and strike the diffuser plate 260. The diffuser plate 260 is separated from an upper edge of the cap 220 by a distance "L3" of typically about 0.25 to about 2 inches, e.g., from about 0.5 to 1.5 inches. Typically the diffuser plate 260 has an annular shape. However, other shapes are also suitable.

The diffuser plate 260 is spaced a distance "L3" from an upper edge of the cap 220 to define a discharge area. In an embodiment of FIG. 10, the height "L3" is approximately 0.6 inches from the upper edge of cap 220 to the lower edge of the diffuser plate 260. The diffuser plate 260 extends radially from the conduit 202 of the mixing device 200 to define a surface which overlaps the entire annular opening defined by the upper edge of the cap 202. The diffuser plate 260 is generally parallel to the upper edge of the cap 220.

Typically, the above-described ratios of the annular area of flow through the cap and the discharge area between the cap and diffuser plate of the embodiment of FIG. 1 also apply to this sand trap embodiment.

Figure 13:
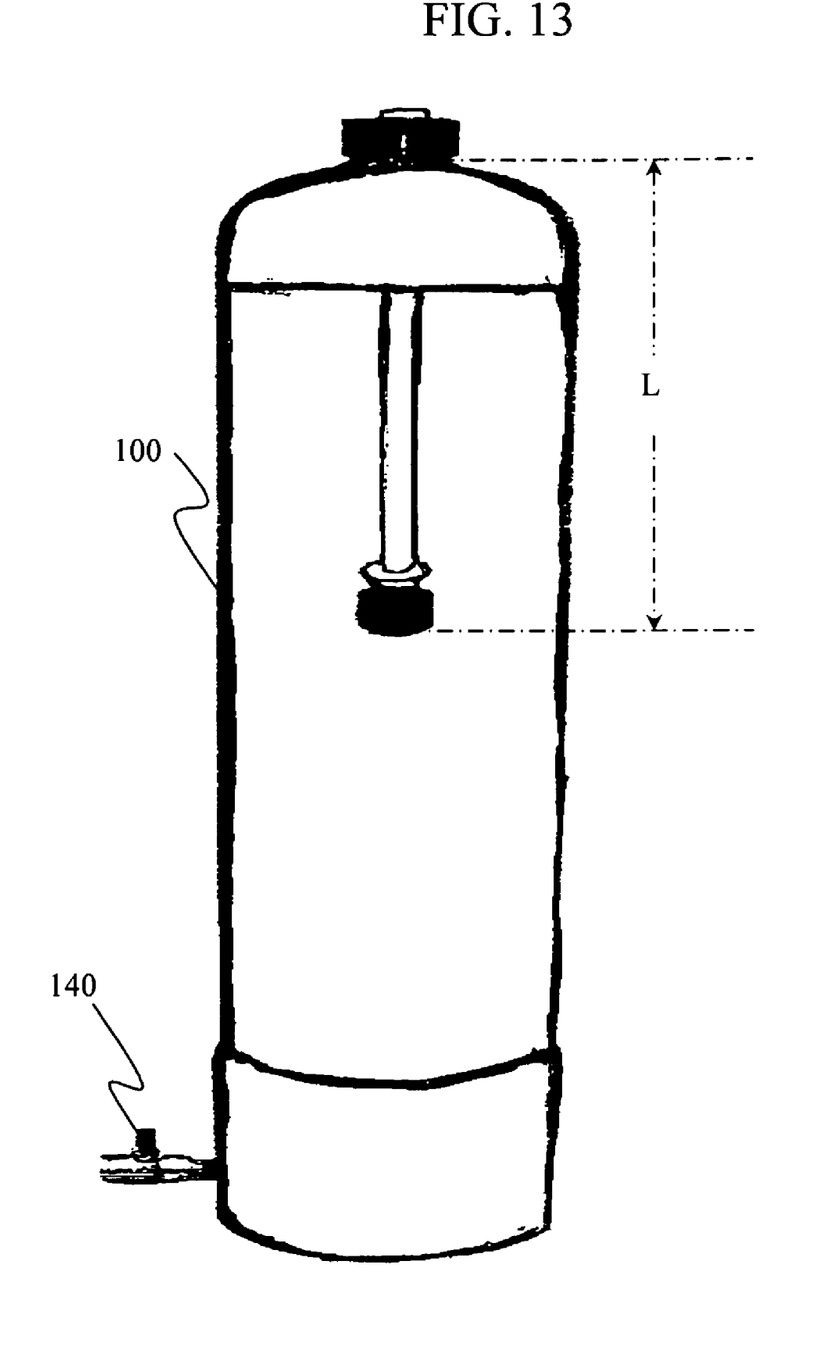
FIG. 13 illustrates an embodiment of the sand trap consistent with the embodiment of FIG. 12.

FIG. 13 illustrates an embodiment of the sand trap 100 consistent with the embodiment of FIG. 12.

Figures 14, 15:
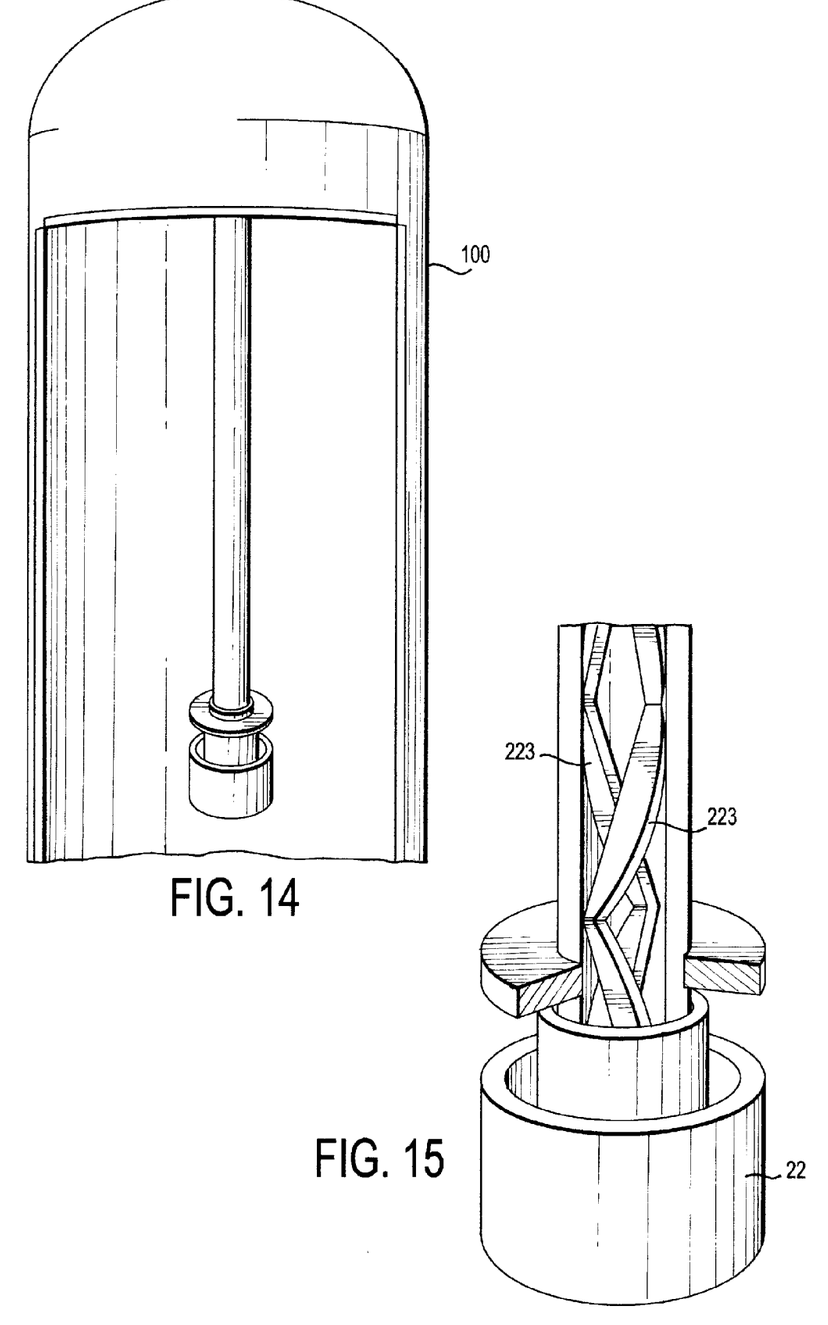
FIG. 14 is a photograph of an upper section of the embodiment of the sand trap of FIG. 14.
FIG. 15 is a close up photograph of an end cap suitable for the mixing section of FIG. 14 with a portion of the tube and the deflecting plate removed to better show the baffles.

FIG. 14 is a photograph of an upper section of the embodiment of the sand trap 100 of FIG. 13.

FIG. 15 is a close up photograph of a white end cap suitable for substituting for the black end cap of the sand trap 100 of FIG. 14 with a portion of the tube and the deflecting plate removed to better show the baffles 223.

One significant advantage of the present invention is that is there is a low liquid usage rate, and thus a low flow rate through the mixing chambers and the tank, there is sufficient time for the liquid and the additive to achieve saturation.

In contrast, another advantage of the present invention is that if there is a high liquid usage rate, and thus a high flow rate through the tube and the tank, then there is increased mixing of the liquid and the additive to achieve saturation.

It is also clear that, although the invention has been described with reference to a specific example, a person of skill will certainly be able to achieve many other equivalent forms, all of which will come within the field and scope of the invention.

I claim:

1. A static mixer device, comprising:
    a conduit comprising an upper mixing chamber, a swirl chamber, a lower mixing chamber and a diverter chamber;
    a cap; and
    a diffuser plate;
    the upper mixing chamber having a first inlet and a first outlet and an axial centerline in a longitudinal direction of main stream flow;

the swirl chamber having a second inlet and a second outlet, the second inlet being in fluid communication with the first outlet of the upper mixing chamber;

the lower mixing chamber having a third inlet and a downwardly directed third outlet and an axial centerline in the longitudinal direction of main stream flow, the third inlet of the lower mixing chamber being in fluid communication with the second outlet of the swirl chamber;

a plurality of baffles arranged within the upper mixing chamber and the lower mixing chamber, wherein the plurality of baffles are shaped and arranged for subdividing a flow of an additive material against a plurality of portions of an internal perimeter of the upper mixing chamber and the lower mixing chamber, and for redirecting the subdivided flow of the additive material to the axial centerline of the upper and lower mixing chambers to form a single direction mixing vortex axial to the centerline of the upper mixing chamber and the lower mixing chamber;

the diverter chamber having sidewalls provided at a lower end of the conduit below the lower mixing chamber, the diverter chamber having a fourth inlet and a fourth outlet, the fourth inlet being in fluid communication with the third outlet of the lower mixing chamber and arranged in the longitudinal direction of the main stream flow of the lower mixing chamber, and the fourth outlet comprising a plurality of slits in the diverter chamber sidewalls, the slits being radially arranged relative to the axial direction of the lower mixing chamber;

the cap having a bottom wall and one or more cap sidewalls, the cap being connected to a lower portion of the diverter chamber, and the cap sidewalls spaced from the diverter chamber and having a height that extends upwardly at least approximately to a height of the plurality of slits to overlap the slits and define an annular region between inner surfaces of the cap sidewalls of the cap and outer walls of the diverter chamber;

the diffuser plate being spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap.

2. The static mixer device according to claim 1, wherein the swirl chamber has an internal passageway adapted to rotate fluid as it travels from the inlet of the swirl chamber to the outlet of the swirl chamber.

3. The static mixer device according to claim 1, wherein the diffuser plate is located a sufficiently close distance above the upper edge of the cap for the diffuser plate to divert fluid discharged from the annular region.

4. The static mixer device according to claim 1, wherein the diffuser plate is located about 0.25 to about 2 inches above the upper edge of the cap.

5. The static mixer device according to claim 1, wherein the diffuser plate extends radially from a lower portion of the lower mixing chamber, wherein the diffuser plate includes an annular area having a predetermined diameter.

6. The static mixer device according to claim 4, wherein a ratio of an annular area of the diffuser plate to the discharge area defined by the space from the upper portion of the cap to the diffuser plate generally ranges from about 1:0.7-3.

7. The static mixer device according to claim 4, wherein a ratio of an annular area of the diffuser plate to the discharge area defined by the space from the upper portion of the cap to the diffuser plate generally ranges from about 1:0.8-2.

8. The static mixer device according to claim 1, wherein the baffles are arranged as a baffle pair in each of the upper mixing chamber and the lower mixing chamber, and wherein each baffle pair is arranged in one of a generally sinusoidal pattern or a saw-tooth pattern.

9. The static mixer device according to claim 8, wherein each baffle pair comprises a plurality of segments arranged to form a series of peaks and valleys such that a first baffle of the baffle pair has a series of peaks and valleys that are opposite of a series of peaks and valleys of a second baffle of the baffle pair.

10. The static mixer device according to claim 8, further comprising a pair of circular ends respectfully connected to the baffle pair at opposite ends, the circular ends being positioned substantially perpendicular to a longitudinal direction of the baffle pairs, and each of the pair of circular ends having an axial hole concentrically aligned in a longitudinal direction of the baffle pair.

11. The static mixer device according to claim 10, wherein a first end of the pair of circular ends has a diameter that is larger than a diameter of a second end of the pair of circular ends.

12. The static mixer device according to claim 8, wherein a position of baffles in the baffle pair arranged in the lower mixing chamber is opposite to a position of baffles in the baffle pair arranged in the upper mixing chamber so as to reverse a rotation of fluid as the fluid passes from the upper mixing chamber to the lower mixing chamber.

13. The static mixer device according to claim 1, further comprising a tank that houses the upper mixing chamber, swirl chamber and lower mixing chamber, and the tank further comprising a drain valve arranged at a lower portion of the tank and a mixed fluid outlet port.

14. The static mixer device according to claim 13, wherein the mixed fluid outlet port is arranged near an upper portion of the tank to permit an upward flow of mixed fluid to exit the tank.

15. The static mixer device according to claim 1, wherein the diffuser plate is located about 0.5 to about 1.5 inches above the upper edge of the cap.

16. A sandtrap device comprising:
a tank;
a fluid outlet port arranged at an upper portion of the tank;
a drain port arranged at a lower portion of the tank;
a conduit comprising a mixing chamber and a diverter chamber inserted into the tank;
a cap; and
a diffuser plate;
the mixing chamber having a first inlet and a first outlet and an axial centerline in a longitudinal direction of main stream flow;
a plurality of baffles arranged within the mixing chamber, wherein the plurality of baffles are shaped and arranged for subdividing a flow of an additive material against a plurality of portions of an internal perimeter of the upper mixing chamber and the lower mixing chamber, and for redirecting the subdivided flow of the additive material to the axial centerline of the upper and lower mixing chambers to form a single direction mixing vortex axial to the centerline of the upper mixing chamber and the lower mixing chamber;
the diverter chamber having sidewalls provided at a lower end of the conduit below the mixing chamber, the diverter chamber having a second inlet and a second outlet, the second inlet being in fluid communication with the first outlet of the mixing chamber and arranged in the longitudinal direction of the main stream flow of the mixing chamber, and the second outlet comprising a plurality of slits in the diverter chamber sidewalls, the slits being radially arranged relative to the axial direction of the mixing chamber;

the cap having a bottom wall and one or more cap sidewalls, the cap being connected to a lower portion of the diverter chamber, and the cap sidewalls spaced from the diverter chamber and having a height that extends upwardly at least approximately to a height of the plurality of slits to overlap the slits and define an annular region between inner surfaces of the cap sidewalls of the cap and outer walls of the diverter chamber;

the diffuser plate being spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap;

wherein a length of the conduit within the tank chamber is approximately one-half to two thirds of a height of the tank.

17. The sandtrap according to claim 16, wherein a ratio of an annular area of the diffuser plate to the discharge area defined by the space from the upper portion of the cap to the diffuser plate generally ranges from about 1:0.7-3.

18. The sandtrap device according to claim 16, wherein a ratio of an annular area of the diffuser plate to the discharge area defined by the space from the upper portion of the cap to the diffuser plate generally ranges from about 1:0.8-2.

19. The sandtrap device according to claim 16, wherein the diffuser plate is located about 0.25 to about 2 inches above the upper edge of the cap.

20. A method for mixing a first liquid material and an additive material in the static mixing device of claim 1, comprising the steps of:

passing a first liquid material and an additive material through an upper mixing chamber, a swirl chamber, a lower mixing chamber and a diverter chamber of a conduit in a tank;

the upper mixing chamber having a first inlet and a first outlet and an axial centerline in a longitudinal direction of main stream flow;

the swirl chamber having a second inlet and a second outlet, the second inlet being in fluid communication with the first outlet of the upper mixing chamber;

the lower mixing chamber having a third inlet and a downwardly directed third outlet and an axial centerline in the longitudinal direction of main stream flow, the third inlet of the lower mixing chamber being in fluid communication with the second outlet of the swirl chamber;

a plurality of baffles arranged within the upper mixing chamber and the lower mixing chamber, wherein the plurality of baffles are shaped and arranged for subdividing a flow of the first material and the additive material against a plurality of portions of an internal perimeter of the upper mixing chamber and the lower mixing chamber, and for redirecting the subdivided flow of the first material and the additive material to the axial centerline of the upper and lower mixing chambers to form a single direction mixing vortex axial to the centerline of the upper mixing chamber and the lower mixing chamber to form a mixed stream;

discharging the mixed stream from the lower mixing chamber downwardly into the diverter chamber;

discharging the mixed stream from the diverter chamber laterally through slits, radially arranged in sidewalls of the diverter chamber relative to the axial direction of the lower mixing chamber, into an annular region defined between outer walls of the diverter chamber and inner sidewalls of a cap and passing the mixed stream upwardly through the annular region, the cap having a bottom wall and the cap sidewalls, the cap being connected to a lower portion of the diverter chamber, and the cap sidewalls spaced from the diverter chamber and having a height that extends upwardly at least approximately to a height of the plurality of slits to overlap the slits and define an annular region between inner surfaces of the cap sidewalls of the cap and outer walls of the diverter chamber;

the mixed stream discharging from the annular region and being diverted by a diffuser plate spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap;

discharging the mixed stream from the discharge area such that the mixed stream has centrifugal motion when the mixed stream discharges from the discharge area and contacts the material in the tank; and receiving the mixed material from an exit port of the tank arranged to receive the mixed stream as the mixed stream rotates upward in the tank.

21. A method for separating solids from liquid in the sandtrap device of claim 16, comprising:

passing a feed stream comprising liquid and solids through a conduit comprising a mixing chamber and a diverter chamber inserted into a tank, the mixing chamber having a first inlet and a first outlet and an axial centerline in a longitudinal direction of main stream flow;

passing the feed stream through a plurality of baffles arranged within the mixing chamber, wherein the plurality of baffles are shaped and arranged for subdividing a flow of the feed stream against a plurality of portions of an internal perimeter of the mixing chamber, and for redirecting the subdivided flow of the feed stream to the axial centerline of the mixing chamber to form a single direction mixing vortex axial to the centerline of the mixing chamber;

downwardly discharging the feed stream into a diverter chamber having sidewalls provided at a lower end of the conduit below the mixing chamber, the diverter chamber being in fluid communication with the mixing chamber and arranged in the longitudinal direction of the main stream flow of the mixing chamber, discharging the feed fluid from the diverter chamber laterally through slits, radially arranged in sidewalls of the diverter chamber relative to the axial direction of the lower mixing chamber, into an annular region defined between outer walls of the diverter chamber and inner sidewalls of a cap and passing the mixed stream upwardly through the annular region, the cap having a bottom wall and the cap sidewalls, the cap being connected to a lower portion of the diverter chamber, and the cap sidewalls spaced from the diverter chamber and having a height that extends upwardly at least approximately to a height of the slits to overlap the slits and define an annular region between inner surfaces of the cap sidewalls of the cap and outer walls of the diverter chamber;

the feed stream discharging from the annular region and being diverted by a diffuser plate spaced from an upper edge of the cap to define a discharge area, the diffuser plate extending radially from the conduit to define a surface which overlaps the entire annular opening defined by an upper edge of the cap and the conduit, the diffuser plate being generally parallel to the upper edge of the cap;

discharging the feed stream from the discharge area such that the feed stream has centrifugal motion to separate at least a portion of the solids from the liquid in the feed stream when the feed stream discharges from the discharge area and contacts the material in the tank to produce a liquid product stream; and receiving the liquid product stream from a fluid outlet port of the tank arranged at an upper portion of the tank to receive the liquid product stream as the liquid product stream rotates upward in the tank;

receiving the separated solids from a drain port arranged at a lower portion of the tank;

wherein a length of the conduit within the tank chamber is approximately one-half to two thirds of a height of the tank.

* * * * *